United States Patent
Fujita et al.

(10) Patent No.: US 7,137,741 B2
(45) Date of Patent: Nov. 21, 2006

(54) ROLLING BEARING

(75) Inventors: Shinji Fujita, Hiratsuka (JP); Youichi Matsumoto, Yokohama (JP); Yasuo Murakami, Hadano (JP); Nobuaki Mitamura, Yokohama (JP); Shigeru Okita, Yokohama (JP)

(73) Assignee: NSK Ltd., Tokyo (JP)

( * ) Notice: Subject to any disclaimer, the term of this patent is extended or adjusted under 35 U.S.C. 154(b) by 82 days.

(21) Appl. No.: 10/310,900

(22) Filed: Dec. 6, 2002

(65) Prior Publication Data

US 2003/0123770 A1 Jul. 3, 2003

(30) Foreign Application Priority Data

Dec. 27, 2001 (JP) ............... 2001-398493

(51) Int. Cl.
*F16C 33/58* (2006.01)
*F16C 33/32* (2006.01)
*F16C 33/00* (2006.01)

(52) U.S. Cl. ............... 384/569; 384/456; 384/492; 384/625

(58) Field of Classification Search ............... 384/569, 384/456, 490, 492, 493, 549, 625, 527, 43
See application file for complete search history.

(56) References Cited

U.S. PATENT DOCUMENTS

| | | | |
|---|---|---|---|
| 4,004,952 A | | 1/1977 | Jatczak et al. |
| 4,334,926 A | * | 6/1982 | Futamura et al. ............. 75/230 |
| 4,871,268 A | * | 10/1989 | Furumura et al. ........... 384/492 |
| 4,930,909 A | * | 6/1990 | Murakami et al. ........... 384/492 |
| 5,030,017 A | * | 7/1991 | Murakami et al. ........... 384/492 |
| 5,077,003 A | * | 12/1991 | Muraoka et al. ............. 420/104 |
| 5,282,689 A | * | 2/1994 | Imamura et al. ............. 384/492 |
| 5,292,200 A | * | 3/1994 | Matsumoto et al. ......... 384/492 |
| 6,143,425 A | * | 11/2000 | Tanaka et al. ............... 428/627 |
| 6,248,186 B1 | * | 6/2001 | Yamamura et al. ......... 148/319 |
| 6,309,475 B1 | | 10/2001 | Takayama et al. |
| 6,315,456 B1 | * | 11/2001 | Tanimoto et al. ........... 384/527 |
| 6,332,714 B1 | * | 12/2001 | Takemura et al. ............ 384/43 |

FOREIGN PATENT DOCUMENTS

| | | |
|---|---|---|
| EP | 1123986 | 8/2001 |
| GB | 2268753 | 1/1994 |
| GB | 2292389 | 2/1996 |
| GB | 2333106 | 7/1999 |
| GB | 2345296 | 7/2000 |
| JP | 63-46299 | 2/1988 |
| JP | 5-240254 | 9/1993 |
| JP | 10-96660 | 4/1998 |
| JP | 11-80838 | 3/1999 |
| WO | 00/28102 | 5/2000 |
| WO | WO 01/29277 A1 * | 4/2001 |
| WO | 01/42524 | 6/2001 |

* cited by examiner

*Primary Examiner*—Richard Ridley
*Assistant Examiner*—Colby Hansen
(74) *Attorney, Agent, or Firm*—Crowell & Moring LLP

(57) ABSTRACT

A rolling bearing intended for longer life by improving seizure resistance and wear resistance in the circumstance with slip contact or in the circumstance where lubricant tends to be exhausted, which is manufactured by applying carburization or carbonitridation to an Si-added material to disperse and precipitate carbides or carbonitrides containing Si or Si—X (X=one or more of Mn, Mo, and Cr) thereby improving the seizure resistance and the wear resistance by the self-lubrication effect thereof, the size of the carbides or carbonitrides being preferably 10 μm or less for preventing flaking, and the area ratio for the carbides or carbonitrides being preferably 1.0–30% for obtaining sufficient self-lubrication effect.

1 Claim, 4 Drawing Sheets

COMPO IMAGE (SEM REFLECTED ELECTRONIC IMAGE)

SEI

Si-Mn CONTAINING CARBONITRIDE

COMPO IMAGE (SEM REFLECTED ELECTRONIC IMAGE)

EDX ANALYSIS

SEI

COMPO IMAGE

EDX ANALYSIS

ROLLING BEARING

BACKGROUND OF THE INVENTION

1. Technical Field of the Invention

Figure 1:
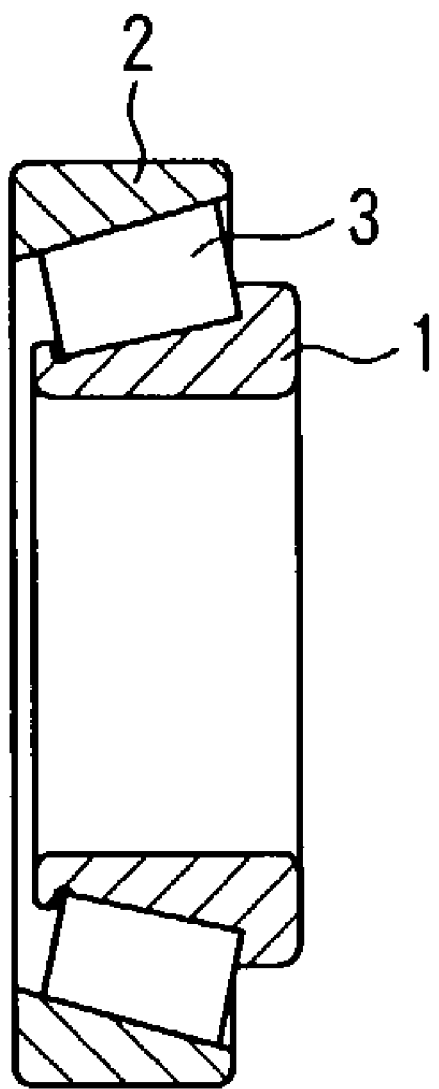

This invention relates to a rolling bearing and, more specifically, it relates to a rolling bearing suitable to be used in the circumstance with sliding contact, under conditions with less lubricant and in the circumstance where the lubricant tends to be exhausted.

2. Description of the Related Art

Generally, a rolling bearing undergoes contact stress repetitively by a rolling motion between a raceway surface and a rolling surface. Particularly, a tapered roller bearing causes a slipping motion between a roller end face and a flange since the rolling surface of the roller is in contact with raceway surfaces of inner and outer rings, and the roller end face is in contact with the guide flange of the inner ring.

In view of the above, it has been required for the bearing material that it is hard, durable to load, and having long rolling life and favorable wear resistance against slipping and SUJ2 is generally used in a case of bearing steel. Further, in a case of a case hardening steel, necessary life and wear resistance are obtained by applying quenching or carbonitriding or carburizing treatment and then applying quenching to a steel material corresponding to SCR420 thereby increasing the hardness to 58–64 of HRC.

However, since the rolling bearing undergoes differential slip in a ball bearing, skew in the roller of a roller bearing, or slipping contact at a flange part, abnormal wear is caused by seizure or friction when the lubrication condition is severe. Then, wear particles are formed as foreign matters, and biting of obstacles lowers the rolling life or results in seizure to bring about a problem of early fracture.

As the countermeasure, it has been proposed, for example, a technique of controlling the surface roughness at the roller end face or the guide flange thereby avoiding direct metal contact between both of them as less as possible as described in Japanese Published Unexamined Patent Application No. 96660/1998, a technique of adding extreme pressure additives for improving the seizure resistance or wear resistance to a lubricant in a case where direct contact is caused on the surface as described in Japanese Published Examined Patent Application No. 79280/1993, or a technique of forming fine pits on the rolling surface or the raceway surface by electrolytic discharging fabrication and arranging them regularly to ensure the lubricant at a contact portion thereby improving the lubrication property as described in Japanese Patent Laid Open No. 240254/1993.

Further, in view of the material, a technique of constituting lubrication parts put under sliding contact with a material comprising graphite, cementite and ferrite as the main ingredient, defining the average particle size of graphite to 1–5 μm and the total content of graphite as a area ratio to 0.1–2.5% as disclosed in Japanese Published Unexamined Patent Application No. 80838/1999.

However, while it has been described for the technique disclosed in Japanese Published Examined Patent Application No. 79280/1993 that molybdenum dialkyl dithiocarbamate or the like is added as the extreme pressure additives to the lubricant, since metal contact tends to occur in a circumstance where lubrication is exhausted, there is a problem that the effect of the extreme pressure additives is not attained.

Further, for the technique described in Japanese Published Unexamined Patent Application No. 240254/1993, since the diameter for the fine pit depends on the diameter of a nozzle through which the electrolyte is jetted, the diameter of the fine pit is substantially restricted to about 100 μm and, in addition, there is a worry of fracture starting from the pit edge and the cost is remarkably increased inevitably since fabrication takes a much time.

Further, for the technique described in Japanese Published Unexamined Patent Application No. 80838/1999, while effectiveness to friction or wear is described, there is no consideration for the seizure and the rolling fatigue.

This invention has been developed for solving the foregoing problems and it intends to provide a rolling bearing capable of improving seizure resistance and reducing friction wear without deteriorating the rolling fatigue even in the circumstance causing differential slip or in the circumstance where lubrication tends to be exhausted.

SUMMARY OF THE INVENTION

For attaining the foregoing intention, the present inventors have made various studies on the seizure and the wear characteristics in the circumstance causing differential slip or in the circumstance where lubricant tends to be exhausted and, as a result, have found that when a rolling surface layer is formed by a hardening heat treatment of carbonitridation or carburization and carbides or carbonitrides containing Si or Si—X (X=one or more of Mn, Mo, and Cr) are dispersed and deposited on the rolling surface layer, seizure resistance and wear resistance can be improved remarkably by the self lubrication effect of the carbides or carbonitrides without deteriorating the rolling life. This is because they have the same effect as the self-lubrication effect, for example, of molybdenum disulfide to prevent metal contact thereby improving the seizure life and the wear life.

The rolling surface layer described above indicates a layer in the direction of the depth from the surface with 653 of Hv or more.

When the size of the carbide or carbonitride containing Si or Si—X (X=one or more of Mn, Mo, Cr) at the rolling surface layer exceeds 10 μm, stress concentration increases to bring about lowering of the rolling life. The substantial lower limit for the size of the carbides or carbonitrides containing Si or Si—X (X=one or more of Mn, Mo and Cr) is 0.5 μm.

Further, when the content of carbides or carbonitrides containing Si or Si—X (X=one or more of Mn, Mo or Cr) at the rolling surface layer is 1% or less, the lubrication effect by the carbides or carbonitrides is not sufficient. On the other hand, when the content of the carbides or carbonitrides exceeds 30%, not only the lubrication effect by the carbides or carbonitrides is saturated but also this lowers the toughness to decreases the rolling life.

For example, while abnormal wear tends to be caused by the slipping motion at the flange of the bearing ring of a tapered roller bearing, when the content of carbides or carbonitrides containing Si or Si—X (X=one or more of Mn, Mo, and Cr) in the rolling surface layer is defined as 1% or more and 30% or less, early wear can be decreased by the lubrication effect of the carbides or carbonitrides, and fine pits are formed after dropping of the carbides or carbonitrides which can retain the lubricant to provide an oil storing effect (M-EHL) and provide remarkable suppression for the friction wear.

The rolling bearing according to the present invention can provide effective function and effect not only to the roller bearings in which a flange for conducting rolling contact and sliding contact relative to the rolling element is disposed to the inner ring but also in deep groove ball bearings, angular ball bearings, and self-aligning ball bearings used in the circumstance of causing differential slip, by the self-lubrication effect of the carbides or carbonitrides containing Si—X (X=one or more of Mn, Mo, and Cr) and the M-EHL effect.

Other elemental ingredients are to be explained.

[C: 0.2 wt %–1.2 wt %]

For obtaining a cleanliness required for the rolling bearing, carbon C is necessary by 0.20 wt % or more. On the other hand, when carbon C exceeds 1.2 wt %, retained austenite increases to lower the dimensional stability of the bearing, or eutectic carbides are formed to shorten the life. For improving the cleanliness, preventing excessive retained austenite and preventing formation of eutectic carbide, the content of carbon C is desirably 1.20 wt % or more and 1.2 wt % or less and, preferably, 0.35 wt % or more and 1.1 wt % or less.

[Si: 0.5 wt %–1.5 wt %]

Silicon Si is indispensable for forming Si-containing carbides or carbonitrides or forming carbides or carbonitrides containing Si—X (X=one or more of Mn, Mo, and Cr) which have an effect for friction wear. It is difficult to improve the seizure resistance or wear resistance at an Si concentration from 0.15 to 0.35 wt % required for deoxidation upon steel preparation. However, since seizure resistant and wear resistant effect of the carbides or carbonitrides is reduced if the addition amount is excessive, it is preferably 1.5 wt % or less.

[Mn: 0.1 wt %–1.5 wt %]

Manganese Mn is an element necessary for deoxidation upon steel making like silicon Si and it is added by 0.1 wt % or more. Further, manganese Mn improves hardenability and also contributes to the improvement of strength and rolling fatigue life after the heat treatment. However, since retained austenite deleterious to the dimensional stability is formed or the workability is deteriorated when the addition amount is excessive, it is desirably 1.5 wt % or less.

[Cr: 2.5 wt % or less]

Chromium Cr improves hardenability and contributes to the improvement of strength and rolling fatigue strength after the heat treatment. However, since workability is lowered or eutectic carbides are formed when the addition amount is excessive, the upper limit is desirably 2.5 wt % or less.

[Mo: 1.5 wt % or less]

Since molybdenum Mo improves hardenability and contributes to the improvement of strength and rolling fatigue life after the heat treatment, it is added selectively. However, since the material cost is increased and the workability is deteriorated when it is carbonized in a great amount, the upper limit is desirably 1.5 wt % or less.

DESCRIPTION OF THE ACCOMPANYING DRAWINGS

Figure 2:
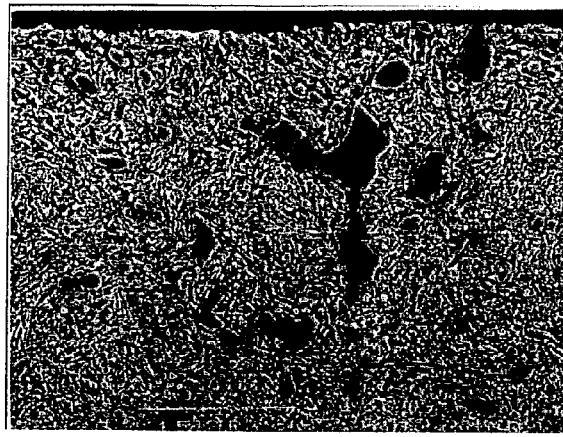
Figure 2:
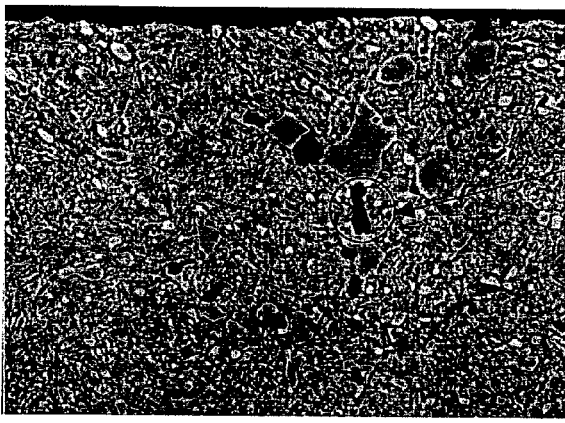
Figure 2:
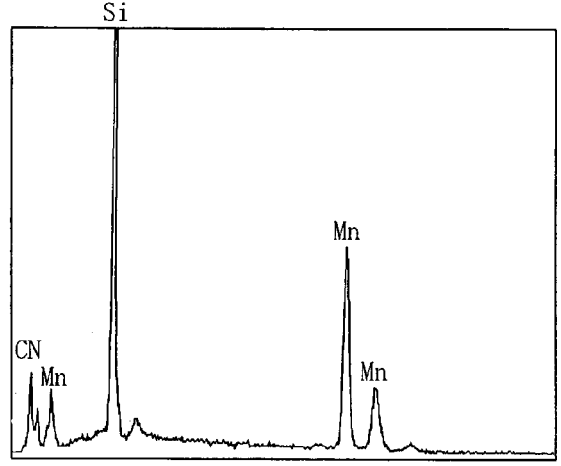
Figure 3:
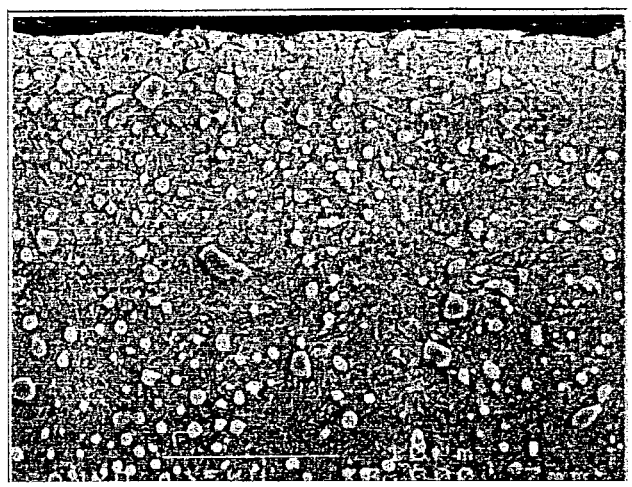
Figure 3:
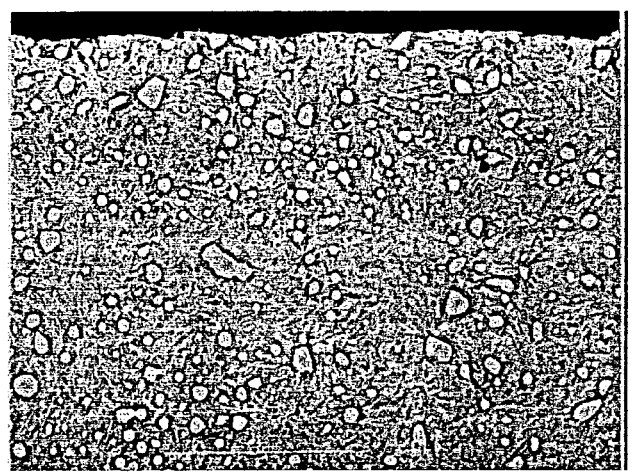
Figure 3:
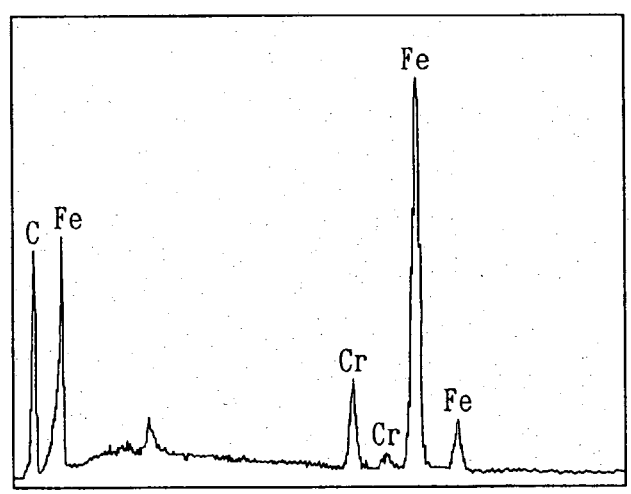
Figure 4:
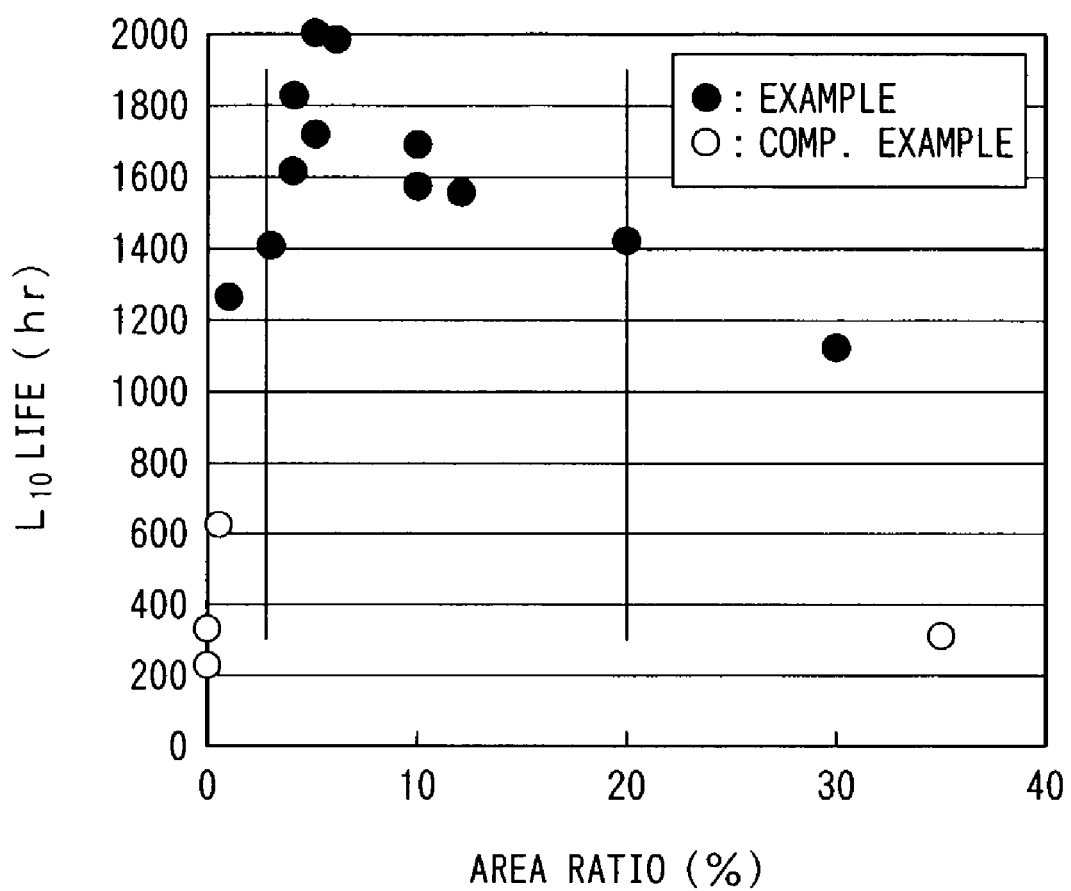

FIG. 1 is a longitudinal cross sectional view showing an embodiment of a rolling bearing according to the present invention;

FIG. 2(a) to (c) show a photograph taken by a scanning type electron microscope for an example of a rolling bearing according to the present invention and an analysis result by an energy dispersive type X-ray analyzer in which FIG. 2(a) is an SEI photograph, FIG. 2(b) is a COMPO image and FIG. (c) is a result of EDX analysis;

FIG. 3(a) to (c) show a photograph taken by a scanning type electron microscope for a comparative example of a rolling bearing according to the present invention and an analysis result by an energy dispersive type X-ray analyzer in which FIG. 3(a) is an SEI photograph, FIG. 3(b) is a COMPO image and FIG. 3(c) is a result of EDX analysis; and FIG. 4 is an explanatory view showing a relationship between the area ratio of carbides or carbonitrides and the life.

PREFERRED EMBODIMENT OF THE INVENTION

Preferred embodiments of the present invention are to be explained below.

FIG. 1 is a cross sectional view of a rolling bearing of this embodiment. The rolling bearing is a tapered roller bearing having an outer diameter $\phi 1$ of 130 mm, an inner diameter $\phi$ of 85 mm and a width of 30 mm. In the drawing, are shown an inner ring 1, an outer ring 2 and a rolling element (tapered roller) 3. As has been described previously, the inner ring 1 of the tapered roller bearing is formed with a flange for supporting the rolling element 3 as described above.

At first, as shown in the following Table 1, test specimens A–H of examples having chemical ingredients within the recommended range and test specimens I–M of comparative examples having chemical ingredients out of the recommended range with respect to the elements indicated by underlines were provided.

TABLE 1

|  | Test Specimen | C | Si | Mn | Cr | Mo | Remarks |
|---|---|---|---|---|---|---|---|
| Example | A | 0.2 | 0.8 | 0.5 | 1.5 | — |  |
|  | B | 0.4 | 1.0 | 0.4 | 1.5 | — |  |
|  | C | 0.4 | 1.0 | 1.0 | 1.5 | — |  |
|  | D | 0.4 | 1.0 | 1.0 | 1.5 | 1.0 |  |
|  | E | 0.6 | 1.0 | 0.5 | 1.5 | — |  |
|  | F | 0.75 | 1.5 | 0.5 | 2 | 1.0 |  |
|  | G | 1.2 | 1.0 | 0.5 | 1.5 | 1.0 |  |
|  | H | 1.05 | 0.6 | 1.0 | 1.0 | — | Corr. to SUJ3 |
| Comp. Example | I | 0.95 | 0.25 | 0.4 | 1.4 | — | Corr. to SUJ2 |
|  | J | 0.2 | 0.25 | 0.5 | 1.1 | — | Corr. to SCR420 |
|  | K | 1.3 | 1 | 0.5 | 1.5 | 0.5 |  |
|  | L | 0.4 | 1.8 | 0.4 | 1.5 | 1.0 |  |
|  | M | 0.6 | 1 | 0.4 | 3.5 | 0.5 |  |

Heat treatment was conducted using the test specimens A–M shown in Table 1 under the various conditions shown in the following Table 2. For the heat treatment conditions, the time was changed between 1 to 10 hours in a range from 850 to 950° C. Then, obtained rolling bearings (test specimens) were observed by an optical microscope (magnification factor ×1000, 30 view fields), maximum particle diameter of carbides or carbonitrides in each of the view fields was measured and the maximum particle diameters for 30 view fields were averaged to calculate the particle diameter for the carbides or the carbonitrides. Further, for the area ratio, carbides and carbonitrides each of 0.5 μm or more were observed for 30 view fields by an optical microscope (magnification factor ×1000), and they were measured respectively by image analysis to determine average values. Each of Examples 1 to 13 is within the recommended range of the present invention, while each of Comparative Examples 1 to 9 is out of the recommended range of the present invention regarding the underlined portions.

TABLE 2

|  | Test piece | Test specimen | Heat treatment condition | | Maximum particle diameter (μm) | Area ratio (%) | $L_{10}$ life (hr) |
|---|---|---|---|---|---|---|---|
| Example | 1 | A | Carburization | 930° C. × 1 hr | 1 | 1 | 1260 |
|  | 2 | A | Carbonitridation | 930° C. × 2 hr | 3 | 3 | 1410 |
|  | 3 | B | Carbonitridation | 930° C. × 2 hr | 6 | 5 | 1720 |
|  | 4 | B | Carbonitridation | 930° C. × 2 hr | 6 | 5 | 2000 |
|  | 5 | B | Carbonitridation | 930° C. × 6 hr | 4 | 20 | 1420 |
|  | 6 | C | Carbonitridation | 930° C. × 2 hr | 5 | 6 | 1980 |
|  | 7 | D | Carbonitridation | 930° C. × 2 hr | 4 | 5 | 2000 |
|  | 8 | E | Carbonitridation | 930° C. × 4 hr | 10 | 12 | 1550 |
|  | 9 | F | Carbonitridation | 930° C. × 2 hr | 2 | 10 | 1690 |
|  | 10 | F | Carbonitridation | 930° C. × 4 hr | 6 | 30 | 1120 |
|  | 11 | G | Carbonitridation | 930° C. × 2 hr | 1 | 10 | 1570 |
|  | 12 | H | Carburization | 850° C. × 4 hr | 5 | 4 | 1620 |
|  | 13 | H | Carbonitridation | 850° C. × 4 hr | 5 | 4 | 1830 |
| Comp. Example | 1 | I | Direct quenching | 850° C. × 2 hr | — | 0 | 160 |
|  | 2 | I | Carbonitridation | 930° C. × 4 hr | 4 | 0.5 | 350 |
|  | 3 | J | Carbonitridation | 930° C. × 2 hr | 4 | 0.5 | 310 |
|  | 4 | K | Carburization | 930° C. × 4 hr | 12 | 5 | 410 |
|  | 5 | L | Carbonitridation | 950° C. × 2 hr | 7 | 15 | 480 |
|  | 6 | M | Carbonitridation | 950° C. × 4 hr | 15 | 10 | 380 |
|  | 7 | B | Carbonitridation | 950° C. × 10 hr | 8 | 35 | 310 |
|  | 8 | F | Carbonitridation | 910° C. × 1 hr | 4 | 0.5 | 630 |
|  | 9 | G | Direct quenching | 930° C. × 2 hr | — | 0 | 230 |

Life test was conducted by using the rolling bearings (test specimens). The specification for the test is as follows.

Bearing size: φ85×φ130×30 (tapered roller bearing)
Rotational speed: 1500 rpm
Load: 25% of rated dynamic load (P/C=0.25)
Calculated life: 1130 hrs
Lubricant: mineral oil VG10
Circumstantial temperature: room temperature (about 28° C.)
Bearing temperature: 100–110° C. for the outer diameter of outer ring
Number of test specimens: 10

Since the calculated life was 1130 hrs, 2000 hrs was defined as a test termination time.

Both of Examples 1 and 2 were prepared from the test material A in Table 1 and different only in that carburization was conducted for Example 1 and carbonitridation was conducted for Example 2. In each of them, seizure and wear life were improved and life tended to be extended by precipitation of Si-containing carbides or carbonitrides. Further, the area ratio of the Si-containing carbonitrides was increased to improve the life further by applying the carbonitridation.

All of Examples 3–5 were manufactured from the test material B in Table 1 and each of them was applied with carbonitridation as the heat treatment. Example 3 showed a trend of longer life compared with Example 1 since the area ratio of the Si-containing carbonitrides was increased. Example 5 showed L10 life of 1420 hrs since the area ratio of the Si-containing carbides or carbonitrides was increased but it showed the life 4–5 times as long as that of Comparative Example 8 to be described later. Further, Example 4 is identical with Example 3 regarding the test material and the heat treatment conditions in which the rolling element was manufactured from the test material B in Example 3 and the rolling element was manufactured from SUJ2 in Example 4 and carbonitridation was applied. Since the rolling element was prepared by the material different from that of the inner ring and the outer ring, the life was improved outstandingly.

In Example 6 (test specimen C), Mn content of the test specimen B in Example 3 was increased to 1.0 wt % in which a trend of outstandingly longer life was obtained by the increase in the Mn content. Since the amount of the Si—Mn—N carbonitrides formed was increased to further improve the seizure resistance and the wear resistance by the increase in the Mn content as shown in the photograph of scanning type electron microscope (SEM) and the analysis result of the energy dispersive X-ray analyzer (EDX) shown in FIG. 2, a longer life was obtained. In Example 7, Mo was added by 1.0 wt % to the test specimen C, by which carbonitrides of Si—Mn—N, Si—Mo—N and Si—Mn—Mo—N were formed to improve the life.

Also for Examples 8–13, a trend for linger life was observed in the same manner as described above. This is considered that not only the chemical ingredients including Si are at the optimal values but also carburization or carbonitridation was conducted in the heat treatment to precipitate carbides or carbonitrides. Further, in Example 12 and Example 13, the chemical ingredients, the maximum particle diameter of precipitates and the area ratio were identical and it is considered that Si-containing carbonitrides are more favorable in the self-lubricity than Si-containing carbides.

On the contrary, Comparative Example 1 is made of SUJ2 and since usual heat treatment, that is, carburization or carbonitridation was not applied, Si-containing carbides or carbonitrides were not precipitated on the surface layer to bring about seizure or wear, and the L10 life was extremely shorter as 160 hrs compared with the examples described previously.

Further, Comparative Example 2 was made of SUJ2 which was applied with carbonitridation. However, since the Si content was as low as 0.25 wt %, precipitates were mainly comprised of cementite ($Fe_3C$), and the Si-containing carbides or carbonitrides were about 0.5% by area ratio as shown by the SEM photograph and the result of the EDX analysis in FIG. 3, no sufficient self-lubrication effect could be obtained. Further, with the same reasons, the life extending effect was not observed also for Comparative Example 3 because of the low Si content.

Comparative Example 4 was manufactured from the test specimen K. Since the carbon content was as high as 1.3 wt %, eutectic carbides were formed and, in addition, Si-containing macro-carbides were formed when the carburization was applied to shorten the life. Further, Comparative Example 5 contained 1.8 wt % of Si in which the self-lubrication effect of carbides or carbonitrides was lowered to shorten the life. Further, Comparative Example 6 contained 3.5 wt % of Cr in which macro carbides were formed to deteriorate the life when conducting carbonitridation.

Comparative Examples 7–10 used the test specimens within the recommended range of the present invention shown in Table 1. However, since the area ratio of Si-containing carbides or carbonitrides was high in Comparative Example 7, it caused flaking and lowered the life. Further, since the area ratio of the Si-containing carbides or carbonitrides was low in Comparative Example 8, the self-lubrication effect was not sufficient to cause seizure and lower the life. Further, since carburization or carbonitridation was not applied as the heat treatment in Comparative Example 9, Si-containing carbides or carbonitrides were not precipitated, to shorten the life.

Further, FIG. 4 shows a relation between the area ratio of carbides or carbonitrides containing Si or Si—X (X=one or more of Mn, Mo, and Cr) and the life, for Examples 1 to 13 and Comparative Examples 7–9 (chemical ingredients were within the optimum range in all of them). In view of the graph, the area ratio that cause precipitation of carbides or carbonitrides containing Si or Si—X (X=one or more of Mn, Mo, and Cr) to improve the seizure resistance and wear resistance is 1 to 30%. When the area ratio is less than the range, no sufficient self-lubrication effect can be obtained failing to improve the seizure resistance and the wear resistance. On the other hand, if it is more than the range, the toughness is lowered to result in flaking, so that life is deteriorated in both of the cases. For ensuring the self-lubrication effect to improve the seizure resistance and the wear resistance, the area ratio is preferably from 3 to 20% and, more preferably, from 3 to 15%.

In the embodiment described above while description has been made only to the tapered roller bearings specifically, the rolling bearing of the present invention can provide the same function and effect also for deep groove ball bearings, angular ball bearings, self-aligning ball bearings and thrust ball bearings when they are in the circumstance of causing differential slip and provide the same function and effect obtained also for cylindrical roller bearings, self-aligning roller bearings, thrust roller bearings and needle roller bearings when they are in the circumstance where skew occurs.

As has been described above, according to the rolling bearing of the present invention, since carbides or carbonitrides containing Si or Si—X (X=one or more of Mn, Mo, and Cr) each of 0.5 µm to 10 µm are dispersed and precipitated at 1 to 30% content on the rolling surface layer, the seizure resistance and wear resistance can be improved by sufficient self-lubrication effect, as well as flaking or the like can be prevented to greatly improve the life in the circumstance where sliding contact exists or in the circumstance where lubricant tends to be exhausted.

What is claimed is:

1. A rolling bearing having an inner ring, an outer ring and rolling elements, at least one of the inner ring, the outer ring and the rolling elements is made from an alloy steel, in which a rolling surface layer is formed by a hardening heat treatment with carbonitridation or carburization treatment, wherein at least one carbonitride or carbide containing at least one of Si, Si—Mn, Si—Mo and Si—Cr that provide a self lubrication effect by substantially preventing metal contact are dispersed and precipitated to the rolling surface layer, wherein said carbonitrides or carbides are defined as 1 to 30% by area fraction in the rolling surface layer, and a maximum particle diameter of the carbonitrides or the carbides is defined as 0.5 µm or more and 10 µm or less, and wherein said alloy steel contains C: from 0.2 wt % to 1.2 wt %, Si: from 0.5 wt % to 1.5 wt %, Mn: from 0.1 wt % to 1.5 wt %, Cr: 2.5 wt % or less, and Mo: 1.5 wt % or less, the balance being Fe and inevitable impurities.

* * * * *